(12) United States Patent
Matsumoto et al.

(10) Patent No.: US 6,202,947 B1
(45) Date of Patent: *Mar. 20, 2001

(54) DISCHARGE DEVICE FOR MIXING AND DISCHARGING SOLIDS OF THERMOPLASTIC SUBSTANCE AND FIBERS AND PLASTICIZING DEVICE HAVING THIS DEVICE

(75) Inventors: Masahito Matsumoto, Ibaraki; Takeo Kitayama, Takatsuki; Shigeyoshi Matsubara, Osaka, all of (JP)

(73) Assignee: Sumitomo Chemical Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,327

(22) Filed: Dec. 29, 1997

(30) Foreign Application Priority Data

Dec. 27, 1996 (JP) .................................................. 8-350879

(51) Int. Cl.[7] .................................................. B02C 19/12
(52) U.S. Cl. .................. 241/34; 241/101.6; 241/186.35; 241/260.1
(58) Field of Search ............................ 241/260.1, 186.1, 241/186.35, 101.6, 34, 36, 37

(56) References Cited

U.S. PATENT DOCUMENTS

| | | | |
|---|---|---|---|
| 3,396,126 | * 8/1968 | Gurley, Jr. et al. | 260/205 |
| 3,746,315 | 7/1973 | Rizzi et al. | 259/21 |
| 3,873,290 | * 3/1975 | Marzocchi | 65/2 |
| 3,941,318 | * 3/1976 | Ballinger et al. | 241/101.4 |
| 4,061,280 | * 12/1977 | Box | 241/101.6 |
| 4,128,211 | * 12/1978 | Bradbury et al. | 241/101.6 |
| 4,287,799 | * 9/1981 | Fujita et al. | 83/347 |
| 4,344,579 | * 8/1982 | Morita et al. | 241/34 |
| 4,844,289 | * 7/1989 | Dumbaugh | 222/161 |
| 5,383,611 | * 1/1995 | Falini et al. | 241/30 |
| 5,697,560 | * 12/1997 | Bennett | 241/29 |
| 5,743,471 | * 4/1998 | Ivanov | 241/16 |

FOREIGN PATENT DOCUMENTS

| | | | |
|---|---|---|---|
| 0706873A2 | 4/1996 | (EP) | B29C/47/64 |
| 1055395 | * 4/1969 | (GB) . | |
| 2-153714 | 6/1990 | (JP) . | |
| 4-286617 | 10/1992 | (JP) . | |
| 6-8278 | 1/1994 | (JP) . | |
| 6709212 | 1/1968 | (NL) . | |

OTHER PUBLICATIONS

Th. Nijssen, "A Survey of the Most Common Compounding and Feeding Systems using Glass and Virgin Resin", De Ingenieur, vol. 83, No. 31, Aug. 6, 1971, pp. 56–58, XP002061759.

"Coloration Par Pigments En Poudre Un Direct Bien Dose", Plastiques Modern Et Elastomeres, vol. 30, No. 1, Jan.–Feb. 1978, pp. 59–62, XP002061760.

\* cited by examiner

Primary Examiner—John M. Husar
(74) Attorney, Agent, or Firm—Pillsbury Winthrop LLP

(57) ABSTRACT

A discharge device for discharging solids of a thermoplastic substance and fibers includes a discharge passage extending longitudinally and having an inner wall surface forming a passage opened at its lower end, a solid supply device for supplying the solids of the thermoplastic substances to a first position in the passage and a fiber supply device for supplying the fibers to a second position in the passage. A cross line on which a part of the inner wall surface extending downward from an upper one of the first position and the second position intersects a vertical plane forms an angle of 0 to 30° with respect to a vertical line, or all tangent lines for the cross line form angles from 0 to 30° with respect to a vertical line.

15 Claims, 9 Drawing Sheets

DISCHARGE DEVICE FOR MIXING AND DISCHARGING SOLIDS OF THERMOPLASTIC SUBSTANCE AND FIBERS AND PLASTICIZING DEVICE HAVING THIS DEVICE

BACKGROUND OF THE INVENTION

1. Field of the Invention

The present invention relates to injecting machines and extruding machines used to manufacture molded products of fiber-reinforced resins, and particularly to a discharge device for discharging solids of a thermoplastic substance and fibers in a uniformly mixed state and a plasticizing device having this device.

2. Description of the Related Art

Conventionally, injection molding of fiber-reinforced thermoplastic resins is generally performed by methods including the following process steps:

(a) melting and kneading a thermoplastic resin and fibers in an extruding machine;

(b) extruding the melted and kneaded material from the extruding machine to obtain fiber-reinforced resin pellets;

(c) melting and kneading the fiber-reinforced resin pellets in an injecting machine;

(d) injecting the melted and kneaded material from the injecting machine into a mold; and (e) cooling the melted and kneaded material to solidify it in the mold.

Japanese Patent Laying-Open No.4-286617 discloses an injection molding device having an extruding machine for kneading fiber and thermoplastic resin. The extruding machine in this device includes a cylinder having a first opening for supplying thermoplastic resin on the upstream end and a second opening for supplying fiber on the downstream end. The cylinder is equipped with a heater for heating the thermoplastic resin in the cylinder. The thermoplastic resin from the first opening is melted while being transferred toward the second opening by a screw type transferring means. Then fiber is added to the molten thermoplastic resin from the second opening and the fiber and thermoplastic resin are kneaded further downstream. The fiber-reinforced thermoplastic resin obtained this way is injected into a mold and molded. This method has the advantage that molded products of fiber-reinforced thermoplastic resin can be manufactured by almost the same procedure as common injection molding for thermoplastic resins except that fiber is supplied from the second opening provided in the cylinder of the extruding machine. In the case of this device, however, it is necessary to supply the thermoplastic resin and fiber from separated openings of the cylinder and to form a deep groove on the screw so that the fiber supplied from the second opening smoothly gets into the screw in the cylinder.

Japanese Patent Laying-Open No. 2-153714 discloses another device for injection-molding fiber-reinforced thermoplastic resins. This device, too, requires that the thermoplastic resin and fiber should be supplied from separated openings of a cylinder. This device further requires equipment for forcing the fiber into the cylinder at the opening for supplying the fiber.

SUMMARY OF THE INVENTION

An object of the present invention is to simplify the structure of a thermoplastic substances plasticizing device such as an extruding machine.

Another object of the present invention is to provide a discharge device capable of supplying solids of a thermoplastic substance and fibers from a single opening into a cylinder of a plasticizing device.

Still another object of the present invention is to provide a discharge device capable of smoothly discharging solids of a thermoplastic substance and fibers.

A further object of the present invention is to provide a plasticizing device which has a discharge device capable of smoothly discharging solids of a thermoplastic substance and fibers and in which the discharged solids and fibers can be smoothly supplied to a screw.

In order to achieve the objects above, according to a first aspect of the present invention, a discharge device for discharging solids of a thermoplastic substance and fibers includes: a discharge passage longitudinally extending without spreading at least downward and having an inner wall surface forming a passage opened at its lower end; solid supply means for supplying the solids of the thermoplastic substance to a first position in the passage; and fiber supply means for supplying the fibers to a second position in the passage; wherein a cross line on which a part of the inner wall surface extending downward from an upper one of the first position and the second position intersects a vertical plane passing through the opened end of the passage forms an angle of 0 to 30° with respect to a vertical line, or all tangent lines for the cross line form angles from 0 to 30° with respect to a vertical line.

The discharge device constructed as stated above can smoothly and stably discharge solids of a thermoplastic substance and fibers. This discharge device is especially effective when dealing with fibers whose average lengths are in the range of 3 to 50 mm. When this discharge device is used, it is possible to smoothly and stably supply solids of a thermoplastic substance and fibers into a thermoplastic substance plasticizing device from a single opening. Accordingly, this discharge device can contribute to simplification of the structure of the plasticizing device.

In order to achieve the above objects, a second aspect of the present invention relates to a plasticizing device formed of a discharge device for discharging solids of a thermoplastic substance and fibers and a transfer device for accepting the discharged solids and fibers and transferring them downstream, wherein the discharge device comprises a discharge passage longitudinally extending without spreading at least downward and having an inner wall surface forming a passage opened at its lower end; solid supply means for supplying the solids of the thermoplastic substance to a first position in the passage; and fiber supply means for supplying the fibers to a second position in the passage; wherein a cross line on which a part of the inner wall surface extending downward from an upper one of the first position and the second position intersects a vertical plane passing through the opened end of the passage forms an angle of 0 to 30° with respect to a vertical line, or all tangent lines for the cross line form angles from 0 to 30° with respect to a vertical line, and the transfer device comprises a cylinder having an opening facing the lower end of the discharge passage, the opening forming a circle when vertically projected on an imaginary horizontal plane, and a screw provided in the cylinder for transferring the solids of the thermoplastic substance and the fibers supplied from the opening, wherein when the outside diameter of the screw is taken as "a," the diameter of the bottom of a groove of the screw is taken as "b," and the width of the groove is taken as "c," the value c is equal to or smaller than the diameter of the projected form of the opening and the following expression is satisfied, $$\left\{ \left(\frac{a}{2}\right)^2 \pi - \left(\frac{b}{2}\right)^2 \pi \right\} \times c \geq 350 \text{ cm}^3.$$

With a plasticizing device constructed as stated above, solids of a thermoplastic substance and fibers are smoothly and stably supplied from a single opening into a cylinder so that the two materials can be smoothly melted and kneaded. This plasticizing device can be used as an injecting machine or an extruding machine for producing fiber-reinforced thermoplastic resin molded products.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
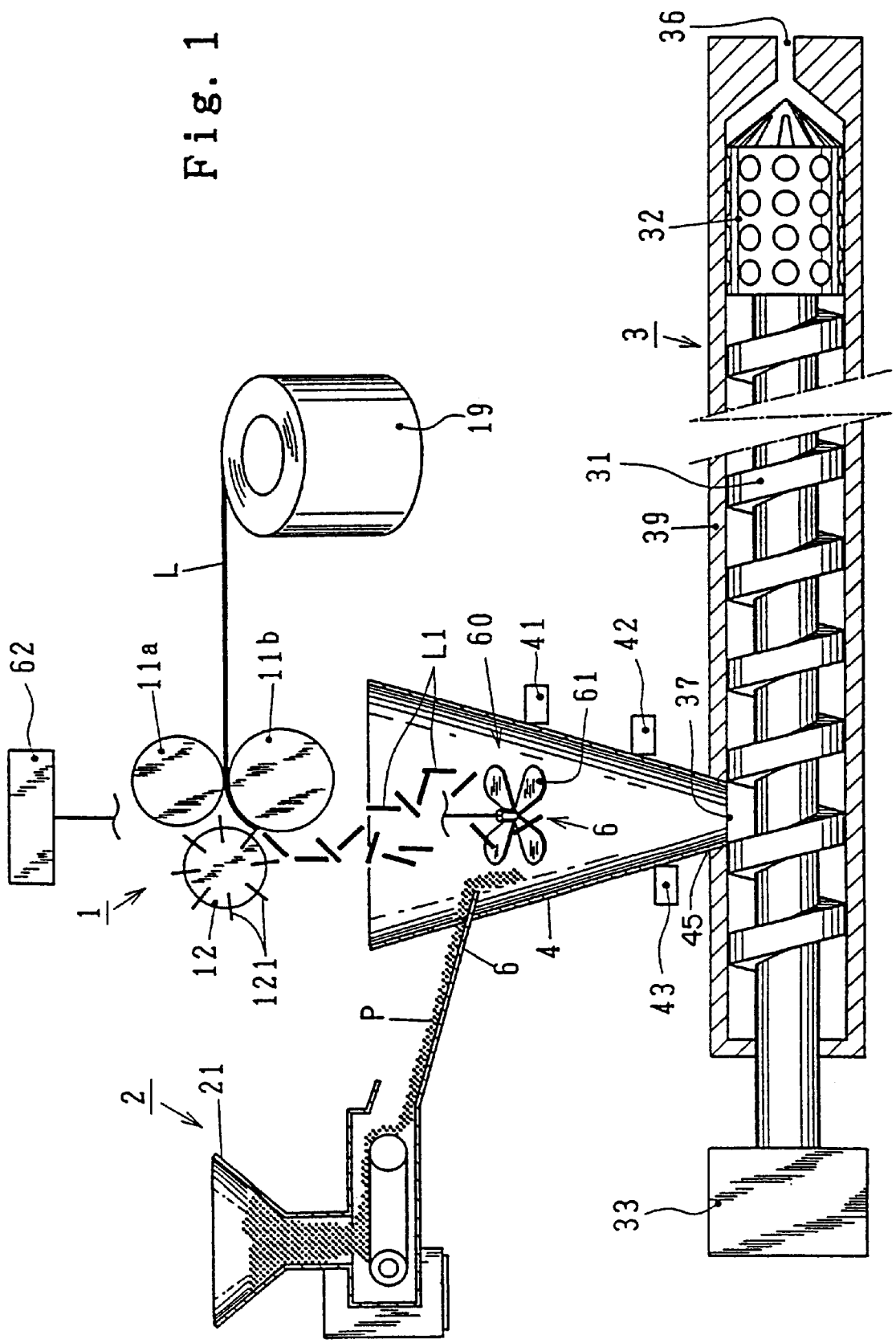
FIG. 1 is a diagram showing the entire structure of an injecting machine according to a first embodiment of the present invention.

FIG. 1 is a cross section of a plasticizing device according to a first embodiment of the present invention, which is formed of a discharge device for discharging solids of a thermoplastic substance (solid thermoplastic substances) and fibers, a cylinder coupled to the discharge device, and a screw provided in the cylinder.

Referring to the drawing, the discharge device has a hopper (4) extending in the longitudinal direction and having an inner wall surface forming a passage, a discharge passage, for the thermoplastic substances and fibers (hereinafter referred to as a material supply passage) with its lower end opened, means for supplying fibers of a certain length into the material supply passage (hereinafter referred to as fiber supply means) and means for supplying the solids of the thermoplastic substance into the material supply passage (hereinafter referred to as solid supply means). The fiber supply means is provided above the hopper (4). While a roving cutter (1) for cutting fibers to a certain length and supplying them, or a feeder for supplying chopped strand fibers cut to a certain length at a constant rate can be applied as the fiber supply means, the embodiment shown in FIG. 1 adopts the roving cutter (1) as the fiber supply means.

Figure 2:
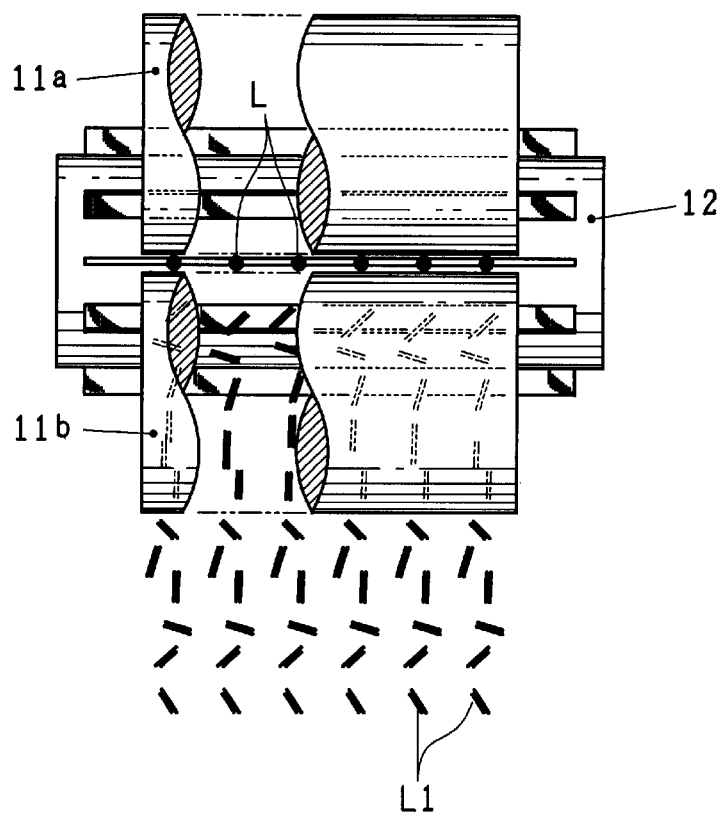
FIG. 2 is a diagram showing the relation between the roving cutter and the feed rollers shown in FIG. 1.

The roving cutter (1) has a first feeding roll (11a) and a second feeding roll (11b) for feeding a plurality of longer fibers (L) wound around a reel (19) in a spread state as shown in FIG. 2, and a cutting roll (12) provided on the exit side of the feeding rolls (11a) and (11b) and having at least one cutting edge (121) for cutting the longer fibers (L) fed from the feeding rolls (11a) and (11b). The cutting roll (12) is positioned so that its cutting edges contact with the second feeding roll (11b) when rotating. In FIG. 1, the cutting roll (12), which rotates in the clockwise direction, is positioned so that the cut fibers (L1) certainly fall inside the hopper (4).

In the first embodiment shown in FIG. 1, four roving glass fibers (2400 tex) are fed between the first feeding roll (11a) and the second feeding roll (11b) as the plurality of longer fibers (L). The fibers fed from the feeding rolls (11a) and (11b) are cut by the cutting roll (12) into cut fibers (L1) having a length of 14 mm. In this embodiment, the discharge rate of the cut fibers (L1) from the roving cutter (1) is set to 2.2 kg/min.

The length of the cut fibers cut by the cutting roll (12) can be mainly adjusted by changing the pitch of the cutting edges (121) provided on the cutting roll. The roving cutter (1) shown in this diagram is adjusted to cut fibers to lengths from about 3 to 50 mm. The discharge device of the invention can be particularly effectively applied to fibers having lengths ranging from about 3 to 50 mm. While the length of the cut fibers (L1) usually somewhat varies with respect to the set value, the discharge device and the plasticizing device of the invention can smoothly deal with cut fibers whose average length is in the above-mentioned range.

Feeders which can supply fibers cut to a predetermined length into the material supply passage at a constant rate can be used as the fiber supply means. That is to say, the feeder has a motor-driven belt conveyer, and may further include an inclined chute for causing cut fibers to slip off.

Figure 3:
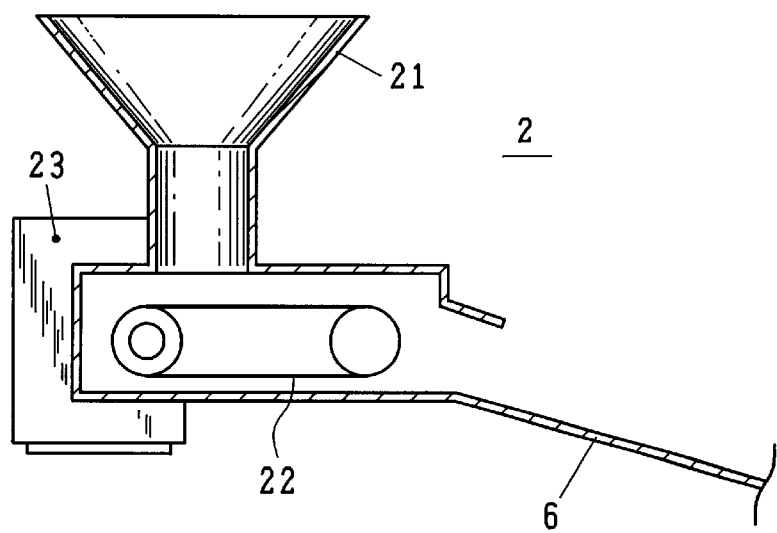
FIG. 3 is a diagram showing a specific structure of the quantitative feeder shown in FIG. 1.

A feeder (2) which can supply a thermoplastic substance in solid form, e.g., pellets, particles, or powders, into the material supply passage at constant rate can be used as the solid supply means. For example, as shown in FIG. 3, the feeder (2) is equipped with a belt conveyer (22) driven by a motor (23). A hopper (21) for accumulating the solids of the thermoplastic substance is provided above the belt conveyer (22). The feeder (2) also has an inclined chute (6) on which the solids of the thermoplastic substance slips down. The chute (6) is arranged so that the solids of the thermoplastic substance flowing out from its end falls into the material supply passage of the discharge device. The speed of the belt conveyer (22) depends on the rotational speed of the motor (23) for driving it. The amount of supply of the solids of the thermoplastic material per unit time can be adjusted by changing the speed of the belt conveyer (22). In this embodiment, the speed for supplying the solids of the thermoplastic substance from the feeder (2) is set to 5.1 kg/min.

In the use of the discharge device of the present invention, denaturant for improving physical properties of the thermoplastic substances or filler other than fibers may be supplied into the material supply passage together with the solids of the thermoplastic substance and fibers.

The plasticizing device of the present invention is characterized in that it has the discharge device of the invention.

The discharge device of the present invention is a discharge device for discharging solids of a thermoplastic substance and fibers, which includes a discharge passage longitudinally extending without spreading at least downward and having an inner wall surface forming a passage opened at its lower end, solid supply means for supplying the solids of the thermoplastic substance to a first position in the passage, and fiber supply means for supplying the fibers to a second position in the passage, wherein a cross line on which a part of the inner wall surface extending downward from an upper one of the first position and the second position intersects a vertical plane passing through the opened end of the passage forms an angle of 0 to 45°, preferably 0 to 30°, and more preferably 0 to 15°, with respect to a vertical line.

It was confirmed that the thermoplastic substances and fibers could be smoothly discharged from the opening at the lower end (45) of the material supply passage when the inner wall surface forming the discharge passage of the discharge device satisfied the above-mentioned condition. This embodiment adopts the hopper (4) in the form of a circular truncated cone whose generatrix and a vertical line form an angle, i.e., the half vertex angle, of 10°. The inner wall surface of the discharge device does not necessarily have to be shaped in circular form in horizontal section, that is to say, it is not limited to a circular truncated cone, but it may be shaped in oval form, regular polygonal form, or asymmetric form in horizontal section, as long as it satisfies the condition mentioned above. The above-mentioned condition about the angle is set to effectively prevent fibers having average lengths from 3 to 50 mm from attaching to the inner wall surface.

While the material of the member having the inner wall surface is not particularly limited, it is preferable to use a material which is not likely to generate static electricity. In this embodiment, the hopper (4) is formed of a material composed of a film (0.4 mm thick) of polyethylene terephthalate and reinforcing stainless steel laid on its outer surface. The hopper (4) may be equipped with a static electricity removing device for spraying static electricity removing air to parts where fibers are liable to attach due to static electricity. In this embodiment, a vibration generating device (43) such as a vibrator for vibrating the hopper (4) is provided on the outer wall of the hopper (4) to more certainly prevent fibers from attaching to the inner wall surface of the hopper (4).

Further, when the amount of the accumulated fibers and solids of the thermoplastic substance in the material supply passage of the hopper (4) is within a certain range, the time required for melting the thermoplastic substances in the plasticizing device becomes stable. Accordingly, it is preferred that the discharge device is equipped with means for sensing the upper and lower limits of the level of the top surface of the material in the material supply passage so as to control the solid supply means and the fiber supply means to start and stop. As such means, this embodiment provides an upper switch (41) for sensing the upper limit of the top surface of the accumulated material and a lower switch (42) for sensing the lower limit of the top surface of the accumulated material on the side of the hopper (4). The lower switch (42) has a structure for starting the solid supply means and the fiber supply means when the top surface of the material in the material supply passage becomes lower than a first level and the upper switch (41) has a structure for stopping the solid supply means and the fiber supply means when the top surface of the material in the material supply passage becomes higher than a second level which is higher than the first level. In this embodiment, the lower switch (42) is attached to the hopper (4) at an interval of 150 mm from the upper switch (41).

Figure 6:
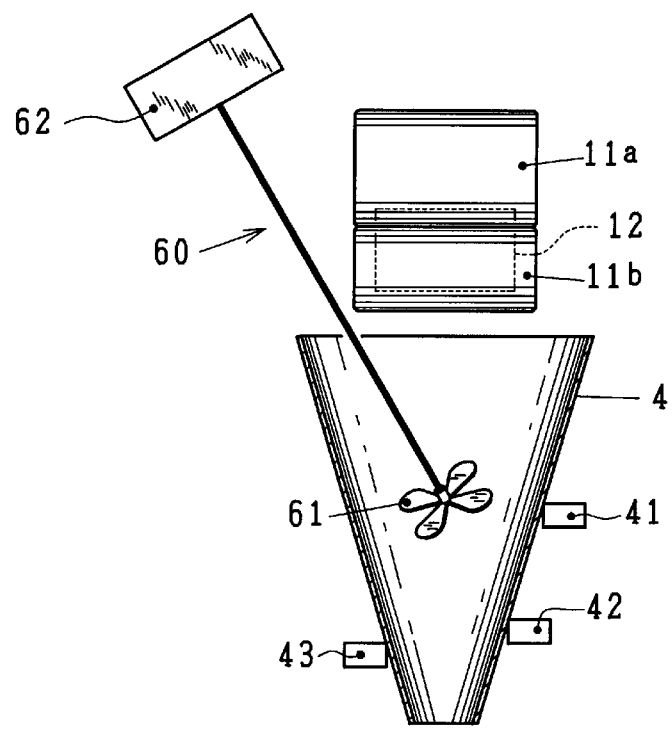
FIG. 6 is a diagram showing the structure of a stirring device according to a second embodiment of the present invention.

The discharge device of the invention preferably includes a stirring device (60) for uniformly mixing the solids of the thermoplastic substance and fibers in the material supply passage. The stirring devices (60) in the first embodiment shown in FIG. 1 and the second embodiment shown in FIG. 6 have stirring blades (61) provided in a position higher than the upper switch (41) and a motor (62) for rotating them. The stirring blades (61) are located below the point where the cut fibers (L1) discharged from the roving cutter (1) and the solids of the thermoplastic substance discharged from the chute (6) of the solid supply means meet, and stir and mix the fibers and the solids of the thermoplastic substance. It is preferable to stir the fibers and thermoplastic substances without applying strong shearing force so as to prevent the cut fibers (L1) from becoming untwisted. Accordingly, in these embodiments, the rotational speed of the stirring blades (61) is set to 600 r.p.m.

Figure 7:
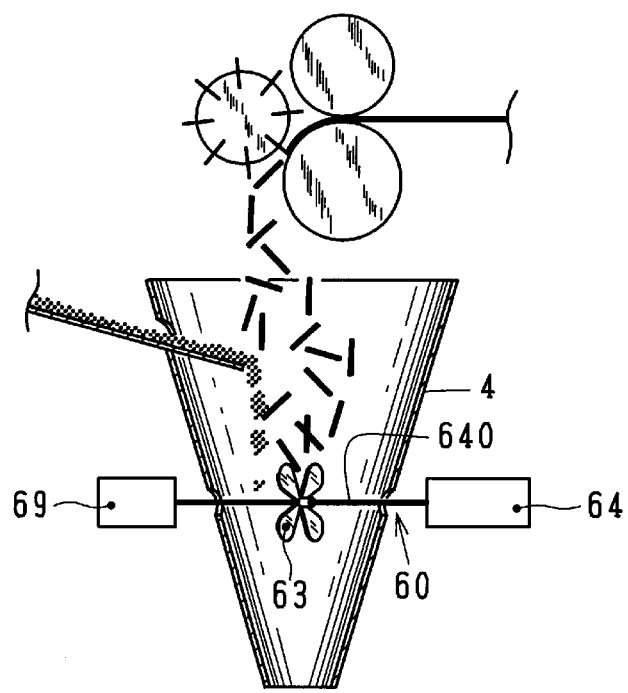
FIG. 7 is a diagram showing the structure of a stirring device according to a third embodiment of the present invention.

As shown in a third embodiment of FIG. 7, stirring blades (63) may be attached to a rotating shaft (640) of a motor (64) passed in the horizontal direction through the inner wall surface of the hopper (4) with its end supported by a bearing (69).

Figure 10:
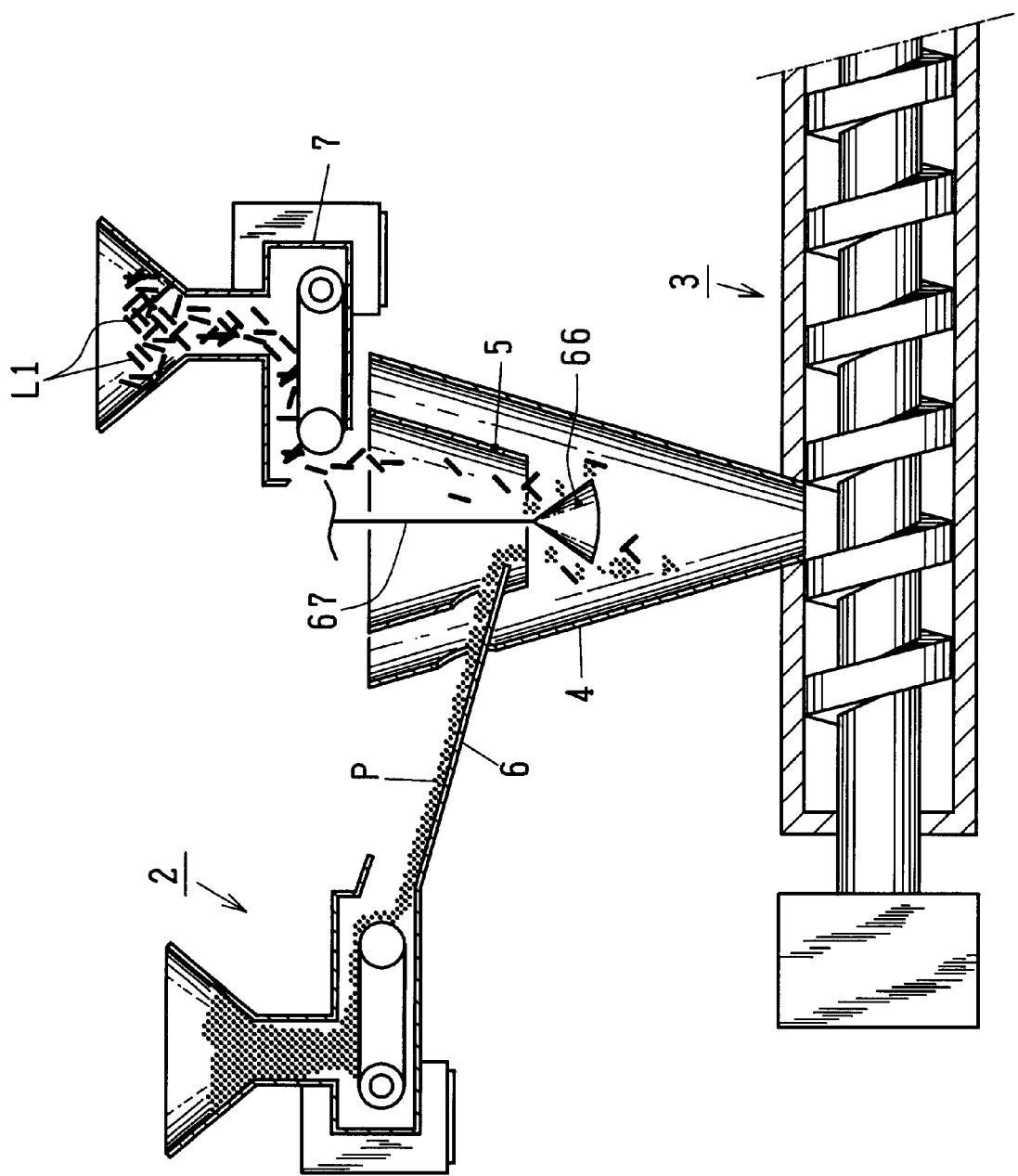
FIG. 10 is a diagram showing the part for supplying solids of a thermoplastic substance in an injecting machine according to a sixth embodiment of the present invention.

In the discharge device of the invention, a member against which the joined fibers and thermoplastic substances collide for changing the flow direction of them may be provided in place of the stirring devices (60) described above. For example, as shown in the embodiment depicted in FIG. 10, an inner tube (5) to which the thermoplastic substances and fibers are supplied from the feeders (2) and (7) may be provided in the material supply passage with a cone-shaped spreading member (66) suspended by wire (67) under the opening at the lower end of the inner tube (5). With this structure, the thermoplastic substances (P) and fibers (L1) falling through the opening at the lower end of the inner tube (5) strike the spreading member (66) to change their direction, and the thermoplastic substances (P) and the fibers (L1) are thus mixed.

Figure 4:
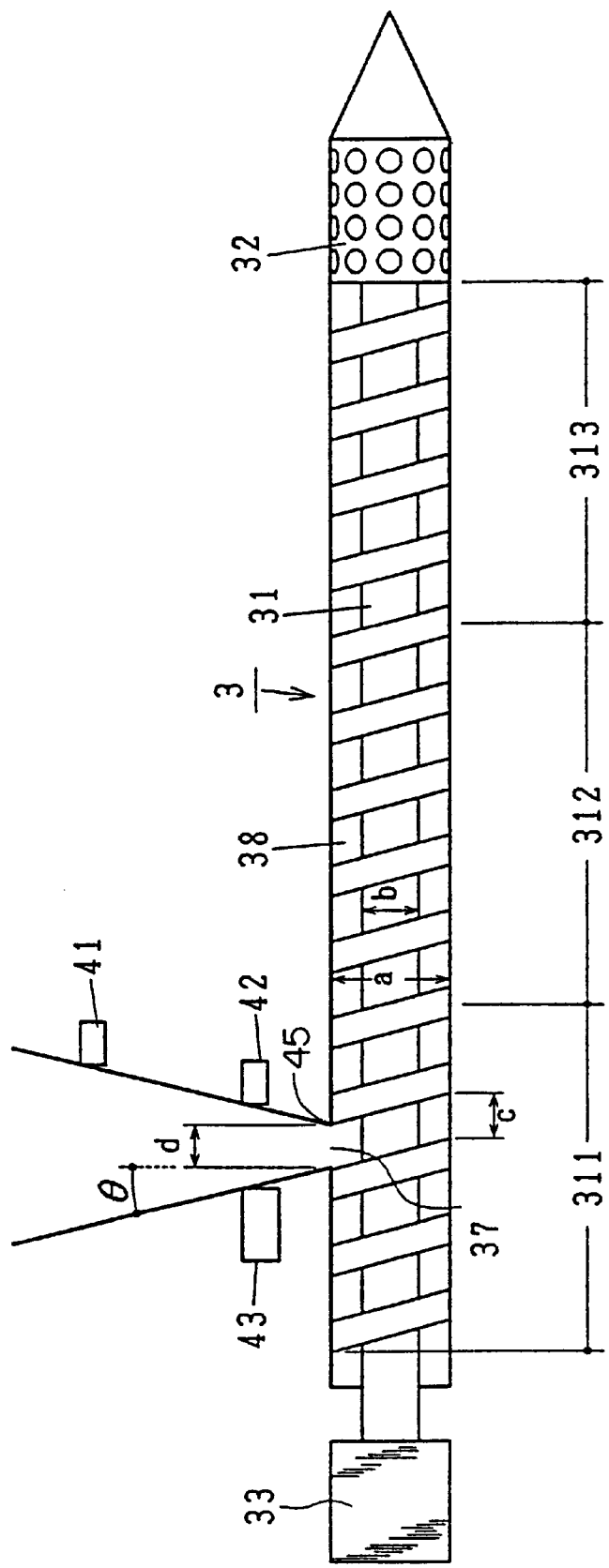
FIG. 4 is a diagram illustrating the tilt angle of the inner wall surface of the hopper and dimensions of the individual zones of the screw in the injecting machine shown in FIG. 1.

Referring to the first embodiment again, the structure of the injecting machine (3) as a plasticizing device for melting the thermoplastic substances and kneading it with fibers, as shown in FIG. 4, is basically the same as that of a known common screw type injecting machine. While the screw (31) moves, as will be described later, backward in the axial direction while rotating, the groove part (38) is preferably dimensioned so that the region corresponding to the material accepting inlet (37) always satisfies the following expression while moving backward. That is to say, in ordinary cases in which the caliber d (cm) of the material accepting inlet (37) is equal to or larger than the groove width c (cm) of the screw (31), the dimensions of the region corresponding to the material accepting inlet (37) in the groove part (38) are preferably set as shown below:

$$\left\{\left(\frac{a}{2}\right)^2 \pi - \left(\frac{b}{2}\right)^2 \pi\right\} \times c \geq 350 \text{ cm}^3. \tag{1}$$

Where the outside diameter of the screw (31) including the flight is taken as a (cm) and the diameter of the groove bottom is taken as b (cm).

It can be confirmed that when the dimensions such as the outside diameter "a" are set to satisfy the expression (1), the material discharged and supplied from the hopper (4) can be smoothly introduced to the screw (31).

While the boundaries between the bases of the flight and the groove bottom are usually formed in circular arc form, the value of the smallest part between the flight is selected as the value of the groove diameter b in the expression (1).

When the caliber d of the material accepting inlet (37) is smaller than the groove width c, the caliber d of the material accepting inlet (37) is substituted in the left side of the expression (1) in place of the groove width c, and the outside diameter a of the screw (31) and the diameter b of the groove are set to satisfy the modified expression (1).

In the case of an injecting machine, since the screw (31) moves backward (in the left direction in the drawing) in the axial direction while rotating, the groove (38) under the material accepting inlet (37) also moves in the axial direction. Accordingly, the values are set so that the groove (38) coming under the material accepting inlet (37) while moving always satisfies the expression (1).

Specific dimensions of the screw diameter a, the groove diameter b and the groove width c are set as follows in this embodiment: the screw diameter a=12 cm, the groove diameter b=8.7 cm, and the groove width c=10.8 cm. Accordingly, the value on the right side of the expression (1) is set to 579 cm$^3$ in this case. The caliber of the material accepting inlet (37) is set to 12 cm.

To prevent fibers from being cut in the process of melting and kneading in the injecting machine (3), a full-flight screw is adopted as the screw (31). A mixing head (32) having a check ring function for preventing the molten resin from reversely flowing to the upstream when injected is attached to an end of the screw (31). This screw (31) is divided into three regions from the base end to the tip end, a feed zone (311) corresponding to the material accepting inlet (37), a compression zone (312) and a metering zone (313), in this order. The groove depth in the feed zone (311) is set to 16.5 mm, the groove depth in the compression zone (312) is set so that it gradually changes from 16.5 mm to 5.25 mm, and the groove depth in the metering zone (313) is set to 5.25 mm. The ratio among the lengths of the feed zone (311), the compression zone (312) and the metering zone (313) of the screw (31) is set to 2:1:1. The flight pitch of the screw (31) in the individual zones is set to 120 mm and the groove width c in the individual zones is set to 10.8 cm.

It is preferred that the compression ratio of this screw (31) is set to 4 or smaller, preferably 1.5 to 4, and the apparent shearing rate is set to 50 to 100 sec$^{-1}$.

The compression ratio is given by the following equation:

Compression ratio=the groove depth in feed zone (311)/the groove depth in metering zone (313).

The apparent shearing rate is given by the following equation:

Apparent shearing rate=$\pi$an/60H

Where a: diameter (cm) of screw (31),
n: the rotational speed (r.p.m) of screw (31), and
H: groove depth (cm).

In this embodiment, a compression ratio of 3.14 is used. By setting the rotational speed of the screw (31) to 60 r.p.m., the apparent shearing rate is set to 71.8 sec$^{-1}$.

The screw (31) is rotation-driven by a screw driving device (33) and is controlled so that it reciprocates in the axial direction.

Figure 5:
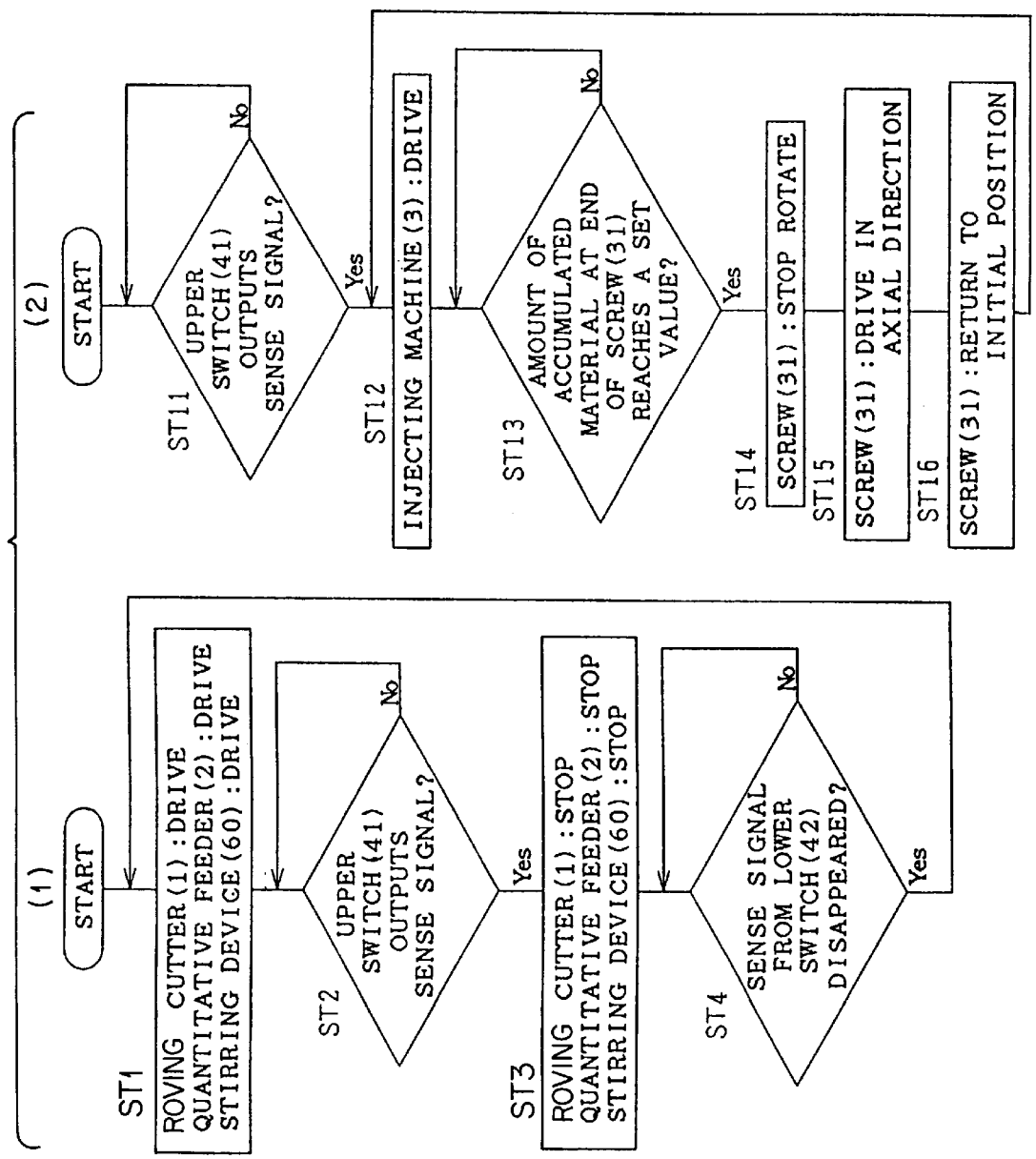
FIG. 5 shows flow charts of operation for controlling the injecting machine shown in FIG. 1.

The plasticizing device shown in FIG. 1 is controlled by a control device (not shown) which performs controlling operation on the basis of the flow charts shown in FIG. 5. The control device includes two computers, a first computer which operates according to the flow chart (1) in the figure and a second computer which operates according to the flow chart (2).

Operation of the device will be described referring to the flow charts.

When the device is operated with thermoplastic substances in pellet form (e.g., a polypropylene resin) supplied in the hopper (21) of the quantitative feeder (2) and the ends of the long reinforcing fibers (L) drawn from the reel (19) and inserted between the feed rolls (11a)(11b), the first and second computers start operating.

When the first computer starts, the roving cutter (1), the quantitative feeder (2) and the stirring device (60) are driven in step (ST1). While the quantitative feeder (2) and the roving cutter (1) may be driven at the same time, or may be driven at different timings, the quantitative feeder (2) and the like are driven at such timing that the thermoplastic substances and fibers can be simultaneously supplied to the hopper (4).

When the roving cutter (1) and the quantitative feeder (2) start, fibers (L1) cut by operation of the roving cutter (1) fall from the fiber discharge outlet (52) of the inner tube (5) into the hopper (4). The thermoplastic substances (P) supplied from the quantitative feeder (2) are transferred on the chute (6) and are supplied into the hopper (4) from its end. Then the fibers (L1) and the thermoplastic substances (P) strike the stirring blades (61) of the stirring device (60) and are stirred and mixed, and the mixture is accumulated in the hopper (4).

Next, when the amount of the accumulated thermoplastic substances (P) and the like supplied into the hopper (4) increases until the top surface reaches the upper switch (41), the upper switch (41) outputs a sense signal, which causes the roving cutter (1), the quantitative feeder (2) and the stirring device (60) to stop (steps (ST2) (ST3)).

When the upper switch (41) outputs the sense signal, the second computer performs steps (ST11) to (ST12) shown in the flow chart (2) in FIG. 5 to drive the injecting machine (3). That is to say, it makes the screw driving device (33) move the screw (31) backward in the axial direction while rotating and makes a heater (not shown) provided on the external surface of the cylinder (39) generate heat. Then the thermoplastic substances (P) and the like are supplied from the lower end of the hopper (4) into the cylinder (39) through the material accepting inlet (37), which are transferred toward the end of the screw (31) and heated by the heater so that the thermoplastic substances (P) gradually melt. Then when the amount of the accumulated molten mixture material reaches a set value at the end of the screw (31), the screw (31) is made to stop rotating (steps (ST13)(ST14)). Subsequently, the screw (31) is advanced in the axial direction by the screw driving device (33). Then the mixing head (32) having a check ring function discharges the molten mixture material from the discharge outlet (36) at the end of the cylinder (39), which is injected into a mold (not shown) and formed into products.

In the course of the above-described operation, when the top surface of the accumulated thermoplastic substances (P) and the like in the hopper (4) decreases under the lower switch (42), the first computer executes step (ST4) shown in the flow chart (1) in FIG. 5 to start the roving cutter (1) and the like again in step (ST1). This way, the top surface of the accumulated thermoplastic substances (P) and the like in the hopper (4) are always kept in the level between the upper switch (41) and the lower switch (42).

When producing molded products of fiber-reinforced resin by melting and mixing a polypropylene resin and glass fibers by using the injecting machine of the embodiments above, cut fibers (L1) having an average length of 14 mm were supplied at a rate of 2.2 Kg/min from the roving cutter (1) and resin pellets were supplied at a rate of 5.1 Kg/min from the quantitative feeder (2). As a result, while it took about 18 sec to bring the mixed material of 2 Kg into a molten state, this time period was always stable and the fibers and thermoplastic substances were smoothly supplied into the injecting machine (3) as a plasticizing device without the hopper (4) becoming clogged.

While the fibers and the like hardly attach to the inner wall of the hopper (4) when the inclination angle θ of the inner wall surface of the hopper (4) is set to not less than 0° nor more than 30° as stated above, it was confirmed that the fibers attach to the inner wall surface of the hopper (4) even under the same conditions when a hopper (4) with an inclination angle θ of 50° is used.

Although the embodiments described above use the screw (31) with which the value on the right side in the expression (1) is set to 579 cm$^3$, fibers and the like were smoothly supplied to the screw (31) when that value was 350 cm$^3$, as well.

Figure 8:
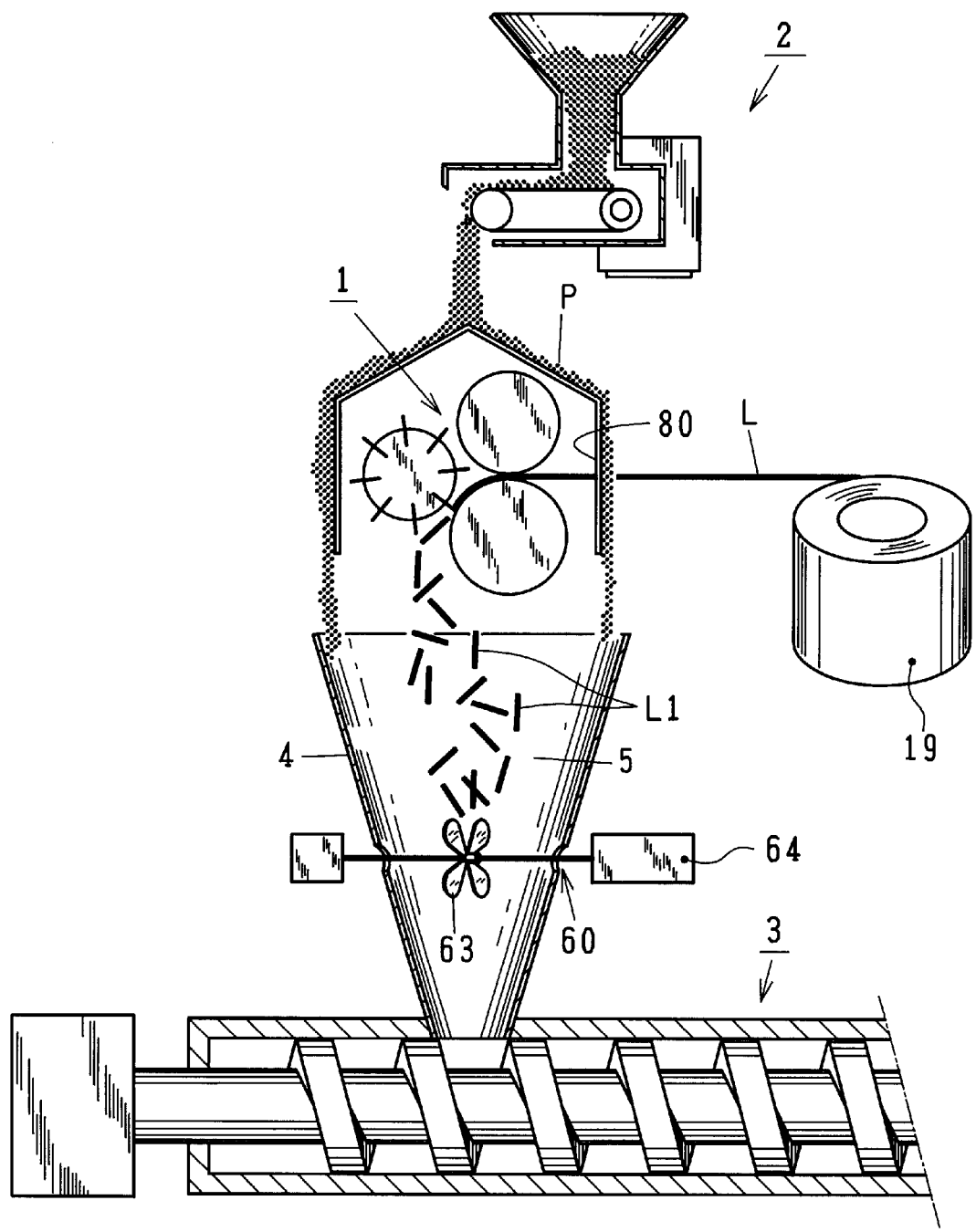
FIG. 8 is a diagram showing the part for supplying solids of a thermoplastic substance in an injecting machine according to a fourth embodiment of the present invention.

The embodiments described above have shown systems in which the thermoplastic substances (P) from the chute (6) are joined from the transverse direction into the falling cut fibers (L1). However, as shown in the fourth embodiment shown in FIG. 8, the quantitative feeder (2) may be provided above the roving cutter (1) such that the thermoplastic substances (P) freely falls in the gap between an inner tube (80) and the hopper (4). In this case, the cut fibers (L1) flow down to the vicinity of the stirring blades (63) while being surrounded by the thermoplastic substances (P) and they are stirred and mixed there. This method does not require the chute (6) in the embodiments shown in FIG. 1 and FIG. 7.

As shown in the embodiments above, in a discharge device having the hopper (4) for discharging fibers and thermoplastic substances, the fibers and thermoplastic substances may be directly supplied into the hopper (4). In order to more uniformly mix the two and lead them to the plasticizing device smoothly, it is more preferable, as shown in the fifth embodiment shown in FIG. 9, to supply fibers into the hopper (4) through an inner tube (5) provided in the hopper (4) and having at least its lower end opened and supply the thermoplastic substances between the outer periphery of the inner tube (5) and the inner periphery of the hopper (4).

Figure 9:
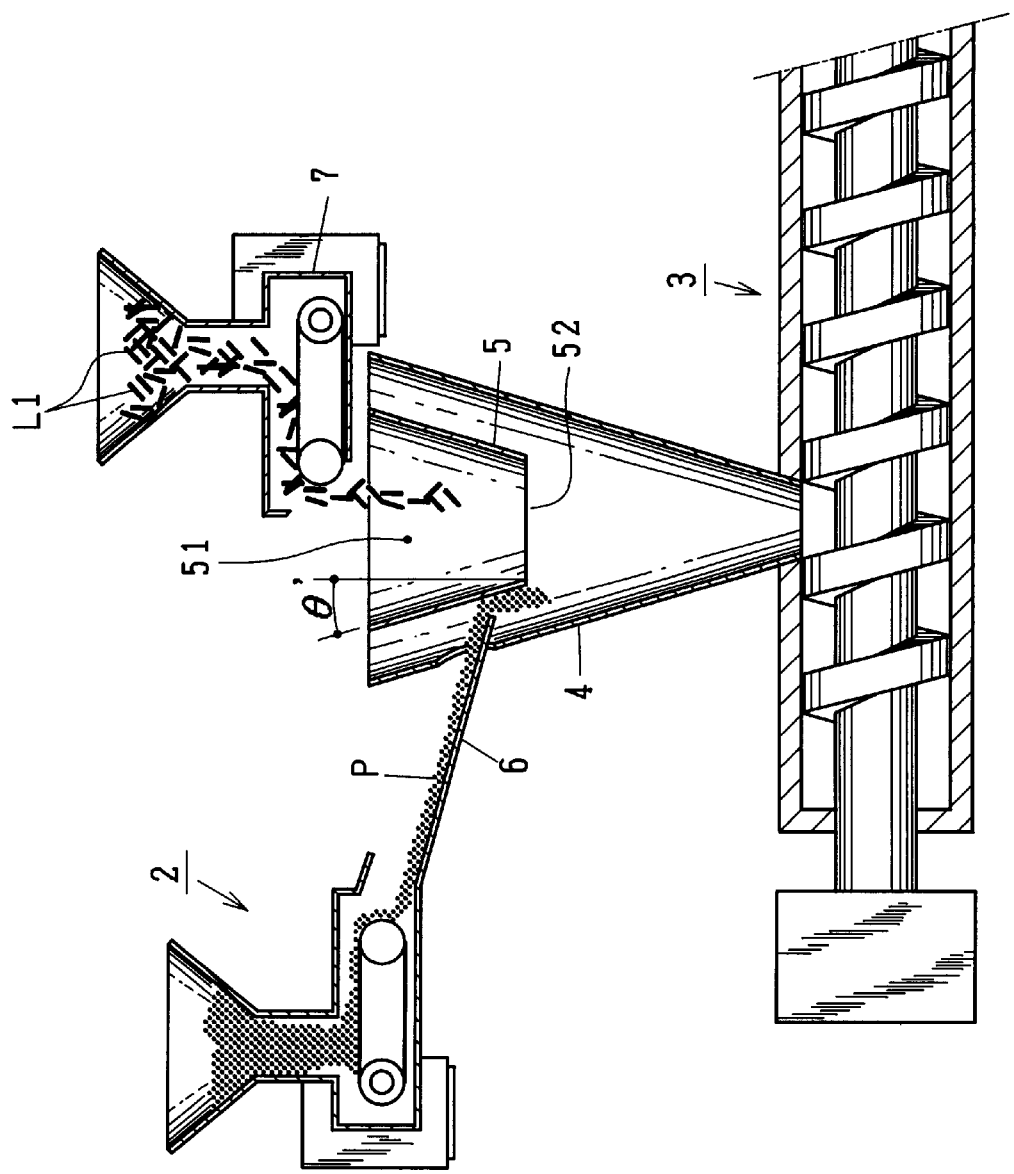
FIG. 9 is a diagram showing the part for supplying solids of a thermoplastic substance in an injecting machine according to a fifth embodiment of the present invention.

In this case, it is preferred that the inner tube (5) is formed of a material not liable to generate static electricity, as well as the hopper (4). As for the shape of the inner tube (5), the fiber inlet (51) and the fiber outlet (52) at its upper and lower ends may be equally sized, or either one of them may be sized larger. When using one in the shape of a reverse cone as shown in the drawing, the inclination angle θ' of the inner wall surface of the inner tube (5) with respect to a vertical line is preferably 30° or smaller, and desirably 15° or smaller. When the angle is set this way, the effect of preventing cut fibers (L1) from attaching is remarkably exhibited. In order to more certainly prevent cut fibers (L1) from attaching to the inner wall surface of the inner tube (5), a vibration generating device, such as a vibrator, may be provided to vibrate the inner tube (5). Further, the thermoplastic substances (P) supplied from the chute (6) may be made to collide with the inner tube (5) as shown in FIG. 9 to vibrate the inner tube (5). Further, stirring blades may be provided to stir and mix the thermoplastic substances (P) and fibers (L1) which meet under the inner tube (5).

Although the embodiment illustrated in FIG. 1 has shown a system in which cut fibers (L1) are formed by using a roving cutter, fibers (L1) may be supplied into the inner tube (5) from a quantitative feeder (7) which can quantitatively supply chopped strand fibers previously cut to certain length, as shown in the embodiment in FIG. 9.

Although the embodiments shown above have described an injecting machine as an example of a plasticizing device, the present invention can also be applied when the plasticizing device is an extruding machine for thermoplastic substances.

Figure 11:
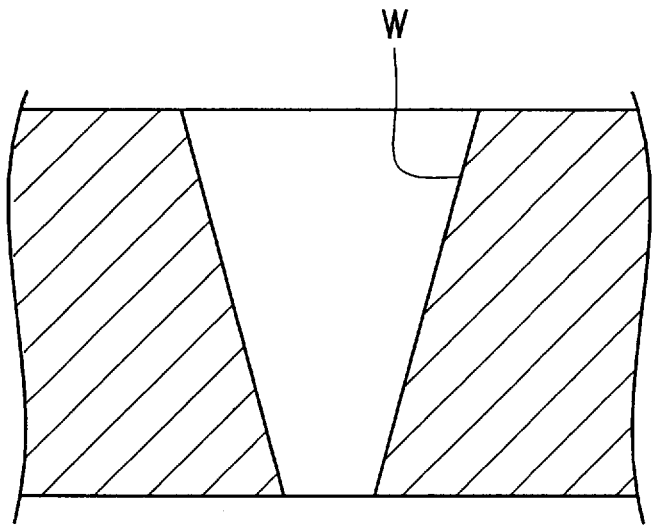
FIG. 11 is a diagram showing a sectional structure of a discharge passage of a discharge device according to a seventh embodiment of the present invention.

The above-described embodiments adopt the tubular hopper (4) whose inner wall surface is inclined at an angle in a given range as a discharge passage of the discharge device. However, the discharge passage is not limited to a tubular hopper, but any structure having an inner wall surface W inclined at a given angle as shown in the seventh embodiment shown in FIG. 11 provides the same effects as the embodiments above.

Figure 12:
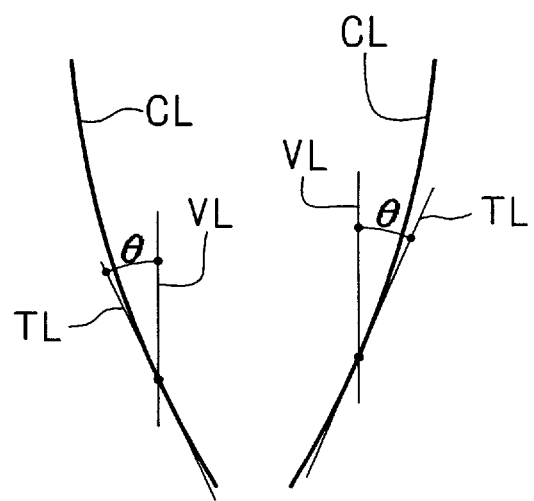
FIG. 12 is a diagram showing forms of cross lines formed by a vertical plane and the inner wall surface of a discharge passage of a discharge device of an eighth embodiment of the present invention.

The above-described embodiments adopt a discharge passage of the discharge device whose inner wall surface intersects a vertical plane to form linear cross lines. However, the cross lines CL may draw curves as shown in the eighth embodiment in FIG. 12. In this case, when the discharge passage is formed so that tangent lines TL at individual points on the cross lines CL and vertical lines VL form angles θ in the range from 0 to 45°, preferably 0 to 30°, more preferably 0 to 15°, the same effects as those of the above-described embodiments can be obtained.

While the invention has been described in detail, the foregoing description is in all aspects illustrative and not restrictive. It is understood that numerous other modifications and variations can be devised without departing from the scope of the invention.

What is claimed is:

1. A discharge device for discharging solids of a thermoplastic substance and fibers, comprising:

a discharge passage longitudinally extending downward to a lower end thereof and becoming narrower in diameter toward the lower end, said discharge passage having an inner wall surface forming a passage opened at the lower end;

a solid supply means for supplying the solids of the thermoplastic substances to a firs position in said passage; and a fiber supply means for supplying the fibers to a second position in said passage;

a means for sensing upper and lower limits of a level of a top surface of material accumulated in said passage which controls the start and stop of both said solid supply means and said fiber supply means:

wherein a cross line on which a part of said inner wall surface extending downward from an upper one of said first position and said second position intersects a vertical plane passing through the opened end of said passage from and angle of 0 to 30° with respect to a vertical line, or all tangent lines for said cross line form angles from 0 to 30° with respect to a vertical line.

2. The discharge device according to claim 1, wherein said solid supply means comprises a feeder having a belt conveyor.

3. The discharge device according to claim 2, wherein said solid supply means further comprises a hopper for accumulating the solids of the thermoplastic substance which are supplied to said belt conveyor.

4. The discharge device according to claim 2, wherein said solid supply means further comprises an inclined chute for causing the solids supplied from said belt conveyor to slip down.

5. The discharge device according to claim 1, wherein said fiber supply means comprises a roving cutter, said roving cutter comprising first and second feeding rolls for feeding uncut fibers and a cutting roll having at least one cutting edge for cutting said fed uncut fibers.

6. The discharge device according to claim 1, wherein said fiber supply means comprises a feeder having a belt conveyor.

7. The discharge device according to claim 6, wherein said fiber supply means further comprises an inclined chute for causing the fibers supplied from said belt conveyor to slip off.

8. The discharge device according to claim 1, further comprising vibrating means for vibrating said inner wall surface.

9. The discharge device according to claim 1, further comprising mixing means provided in said passage for mixing the solids of the thermoplastic substance and the fibers.

10. The discharge device according to claim 9, wherein said mixing means comprises a stirring device, said stirring device comprising a stirring blade and a motor.

11. The discharge device according to claim 9, wherein said mixing means comprises a member against which the solids of the thermoplastic substance and the fibers collide for changing the flow direction of the solids of the thermoplastic substance and fibers at random.

12. The discharge device of claim 1, wherein said means for sensing comprises:
an upper switch for sensing the upper limit of the top surface of the material accumulated in said passage; and
a lower switch for sensing the lower limit of the top surface of the material accumulated in said passage.

13. A discharge device according to claim 1, wherein said solid supply means comprises a feeder having a belt conveyor, and a hopper for accumulating the solids of the thermoplastic substance which are supplied to said belt conveyor, an incline chute for causing the solid supplied from said belt conveyor to slip down; said fiber supply means comprises a roving cutter, said roving cutter comprising first and second feeder rolls for feeding uncut fibers and a cutting roll having at least one cutting edge for cutting said fed uncut fibers, a feeder having a belt conveyor, an inclined chute for causing the fiber supply from said belt conveyor to slip off; a mixing means provided in said passage for mixing the solids of the thermoplastic substance and the fibers, wherein said mixing means comprises a stirring device having a stirring blade and a motor operatively connected to said stirring blade; said sensing means comprises an upper switch for sensing the upper limit of the top surface of the material accumulated in said passage, and a lower switch for sensing the lower limit of the top surface of the material accumulated in said passage, said top and said lower switch cooperative to control both the stop and start of said solid supply means and said fiber supply means; and said discharge device further comprising a transfer device for accepting and transferring discharged solids and fibers, said transfer device comprising a cylinder having an opening facing the lower end of said discharge passage, said opening forming a circle when vertically projected on imaginary horizontal plane, and a screw provided in said cylinder for transferring the solids of the thermoplastic substances and the fibers supplied from said opening, wherein the outside diameter of said screw is represented as a, the diameter of the bottom groove of said screw is represented as b, and the width of said groove is represented by c, and said value c is equal to or smaller than the diameter of the projected form of said opening, whereby the following expression is satisfied $\{(a/2)^2\Pi-(b/2)\Pi\}\times c \geq 350$ cm$^3$.

14. A plasticizing device comprising a discharge device for discharging solids of a thermoplastic substance and fibers and a transfer device for accepting said discharged solids and fibers and transferring them downstream,
wherein said discharge device comprises,
a discharge passage longitudinally extending downward to a lower end thereof and becoming narrower in diameter toward the lower end, said discharge passage having an inner wall surface forming a passage opened at the lower end;
a solid supply means for supplying the solids of the thermoplastic substance to a first position in said passage; and
fiber supply means for supplying the fibers to a second position in said passage;
a means for sensing upper and lower limits of a level of a top surface of material accumulated in said passage which controls the start and stop of both said solid supply means and said fiber supply means;
wherein a cross line on which a part of said inner wall surface extending downward from an upper one of said first position and said second position intersects a vertical plane passing through the opened end of said passage forms an angle of 0 to 30° with respect to a vertical line, or all tangent lines for said cross line form angles from 0 to 30° with respect to a vertical line, and
said transfer device comprises
a cylinder having an opening facing the lower end of said discharge passage, said opening forming a circle when vertically projected on an imaginary horizontal plane, and
a screw provided in said cylinder for transferring the solids of the thermoplastic substance and the fibers supplied from said opening,
wherein when the outside diameter of said screw is taken as a, the diameter of the bottom of a groove of said screw is taken as b, and the width of said groove is taken as c,
said value c is equal to or smaller than the diameter of the projected form of said opening and the following expression is satisfied:

$$\{(a/2)^2\Pi-(b/2)\Pi\}\times c \geq 350 \text{ cm}^3.$$

15. The plasticizing device of claim 14, wherein said means for sensing comprises:
an upper switch for sensing the upper limit of the top surface of the material accumulated in said passage; and
a lower switch for sensing the lower limit of the top surface of the material accumulated in said passage.

* * * * *